(12) United States Patent
Careme et al.

(10) Patent No.: US 11,752,802 B2
(45) Date of Patent: Sep. 12, 2023

(54) TIRE HAVING TREAD SUB-LAYER FLUSH WITH THE GROOVE BOTTOM AND REINFORCING ELEMENTS MADE OF HIGH MODULUS RUBBER INTEGRATED INTO THE TREAD

(71) Applicant: COMPAGNIE GENERALE DES ETABLISSEMENTS MICHELIN, Clermont-Ferrand (FR)

(72) Inventors: Christopher Careme, Clermont-Ferrand (FR); Pascal Prost, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 385 days.

(21) Appl. No.: 16/631,899

(22) PCT Filed: Jun. 26, 2018

(86) PCT No.: PCT/FR2018/051547
§ 371 (c)(1),
(2) Date: Jan. 17, 2020

(87) PCT Pub. No.: WO2019/016440
PCT Pub. Date: Jan. 24, 2019

(65) Prior Publication Data
US 2020/0156413 A1    May 21, 2020

(30) Foreign Application Priority Data
Jul. 17, 2017   (FR) ........................ 1756734

(51) Int. Cl.
*B60C 11/00*    (2006.01)
*B60C 11/03*    (2006.01)
*B60C 9/00*     (2006.01)

(52) U.S. Cl.
CPC ...... *B60C 11/0075* (2013.01); *B60C 11/0008* (2013.01); *B60C 11/0058* (2013.01);
(Continued)

(58) Field of Classification Search
CPC ............. B60C 11/0058; B60C 11/0075; B60C 2011/0025
See application file for complete search history.

(56) References Cited

U.S. PATENT DOCUMENTS

| 4,444,236 A | * | 4/1984 | Kan ...................... B60C 1/0016 152/549 |
| 10,279,629 B2 | | 5/2019 | Hashimoto et al. |

(Continued)

FOREIGN PATENT DOCUMENTS

| EP | 2865543 A1 | 4/2015 |
| FR | 2954333 A1 | 6/2011 |

(Continued)

OTHER PUBLICATIONS

Machine translation for Japan 2015-107776 (Year: 2022).*
(Continued)

*Primary Examiner* — Steven D Maki
(74) *Attorney, Agent, or Firm* — VENABLE LLP

(57) ABSTRACT

A tire having an axis of rotation and a median plane (CP) perpendicular to the axis of rotation, and comprising: a crown reinforcement, a tread positioned radially on the outside of the crown reinforcement and axially between two shoulders, comprising a contact face intended to come into contact with the roadway while the tire is being driven on, wherein the tread is primarily made up of at least one rubber compound of given dynamic shear modulus M and comprises a plurality of furrows oriented substantially circumferentially, each furrow having a furrow bottom, and a sub-layer disposed radially on the outside of the crown (Continued)

reinforcement and radially on the inside of the tread, wherein the sub-layer is made up of at least one rubber compound of given dynamic shear modulus A is flush with each furrow bottom.

9 Claims, 3 Drawing Sheets

(52) U.S. Cl.
CPC ... *B60C 11/0306* (2013.01); *B60C 2009/0078* (2013.01); *B60C 2011/0025* (2013.01)

(56) References Cited

U.S. PATENT DOCUMENTS

| | | | |
|---|---|---|---|
| 10,710,414 B2 | 7/2020 | Bourgeois et al. | |
| 2004/0050469 A1* | 3/2004 | Sandstrom | B60C 1/0016 |
| | | | 152/209.5 |
| 2011/0000594 A1* | 1/2011 | Shima | B60C 11/005 |
| | | | 152/209.18 |
| 2012/0318424 A1 | 12/2012 | Lopitaux et al. | |
| 2016/0082774 A1* | 3/2016 | Zhao | B60C 11/005 |
| | | | 152/153 |
| 2016/0137001 A1 | 5/2016 | Bourgeois et al. | |
| 2017/0050469 A1* | 2/2017 | Hashimoto | B60C 11/00 |
| 2018/0117972 A1* | 5/2018 | Perrin | B60C 11/0058 |
| 2019/0232720 A1* | 8/2019 | Prost | B60C 11/0008 |
| 2019/0255887 A1 | 8/2019 | Perrin et al. | |

FOREIGN PATENT DOCUMENTS

| | | |
|---|---|---|
| FR | 3 010 002 A1 | 3/2015 |
| FR | 3 043 017 A3 | 5/2017 |
| JP | 05-047404 B2 * | 7/1993 |
| JP | 2012-188040 A * | 10/2012 |
| JP | 2015-107776 A * | 6/2015 |
| WO | 2015/170615 A1 | 11/2015 |
| WO | WO-2016/174100 A1 * | 11/2016 |

OTHER PUBLICATIONS

Machine translation for Japan 2012-188040 (Year: 2022).*
Machine translation for Japan 05-047404 B2 (Year: 2022).*
International Search Report dated Sep. 25, 2018, in corresponding PCT/FR2018/051547 (4 pages).

* cited by examiner

TIRE HAVING TREAD SUB-LAYER FLUSH WITH THE GROOVE BOTTOM AND REINFORCING ELEMENTS MADE OF HIGH MODULUS RUBBER INTEGRATED INTO THE TREAD

FIELD OF THE INVENTION

The present invention relates to tyres, and more particularly to a tyre, the performance of which in terms of rolling resistance and road holding is improved.

In general, a tyre is an object with a geometry exhibiting symmetry of revolution about an axis of rotation. A tyre comprises two beads intended to be mounted on a rim; it also comprises two sidewalls connected to the beads, a crown comprising a tread intended to come into contact with the ground, the crown having a first side connected to the radially outer end of one of the two sidewalls and having a second side connected to the radially outer end of the other of the two sidewalls.

The makeup of the tyre is usually described by a representation of its constituent components in a meridian plane, that is to say a plane containing the axis of rotation of the tyre. The radial, axial and circumferential directions denote the directions perpendicular to the axis of rotation of the tyre, parallel to the axis of rotation of the tyre and perpendicular to any meridian plane, respectively. In the following text, the expressions "radially", "axially" and "circumferentially" mean "in a radial direction", "in the axial direction" and "in a circumferential direction" of the tyre, respectively. The expressions "radially on the inside" and "radially on the outside" mean "closer to" and "further away from the axis of rotation of the tyre, in a radial direction", respectively. The equatorial plane CP is a plane perpendicular to the axis of revolution of the tyre, positioned axially so as to intersect the surface of the tread substantially midway between the beads. The expressions "axially on the inside" and "axially on the outside" mean "closer to" and "further away from the equatorial plane of the tyre, in the axial direction", respectively.

PRIOR ART

As is known, tyres for road applications, and very particularly tyres for passenger vehicles make an essential contribution to the performance of the vehicles in terms of rolling resistance (and thus energy efficiency of the vehicles), of grip, of dynamic response for guiding the vehicles (notably when cornering) and of wear (and thus overall cost of using the vehicles). Of the tyre design parameters, a person skilled in the art is aware of the importance of the choice of the material of which the tread is made and the material of which the sub-layer is made. One example of a sub-layer, that is to say of a layer of rubber interposed between the crown reinforcement and the material of the tread, is described in the document FR 2 954 333. Another example, in which the constituent material of the sub-layer is this time flush with the bottoms of the furrows in the tread is provided by the document EP 2 865 543. In general, sub-layer materials under the tread are used to improve the rolling resistance of the tyre with a material of low hysteresis, or to stiffen the tread in shear, but with modest stiffnesses so as not to excessively counter the flattening of the tread of the tyre in its contact patch in which it is in contact with the ground. The prior art also discloses, in the documents FR 3 010 002 and FR 3 043 017, a tyre of which the part of the tread that is intended to be worn away includes different materials.

However, the lower the stiffness, the less good the drift thrust response of the tyre is when subjected to stress by the vehicle turning. Specifically, schematically, the stack of layers of rubber radially on the outside of the crown reinforcement can be considered to be a succession of springs in series. It is for this reason that the introduction of materials with too low a modulus is avoided so as not to impair the cornering stiffness. However, this may conflict with the objective of minimizing the rolling resistance. Even in the variants with the greatest stiffnesses, the dynamic shear modulus G* of a sub-layer material is generally much less than 8 MPa, even when the best performance in terms of handling is desired. In the present document, it is noted that the dynamic shear modulus G* in question is the dynamic shear modulus G* measured at 23° C. and under an alternating shear stress at a frequency of 10 Hz and at 10% deformation.

The document WO 2015/170615 also discloses a tyre having a base layer, that is to say a sub-layer, formed of two radially superposed materials. The modulus of the material of the tread and the tg δ (tangent delta) value thereof are lower than the values of the same parameters of the sub-layer material in contact with the tread material, that is to say that of the two radially outermost layers. The modulus of the material of the radially inner layer of the sub-layer materials and the tg δ value thereof are lower than the values of the same parameters of the sub-layer material in contact with the tread material. However, a tyre made according to this teaching does not achieve any progress in terms of the balance of performance properties.

In order to provide an improvement to overall performance when rubber tread compounds of low stiffness are used, the document WO2016/174100 proposes using a rubber tread compound of low hardness and reinforcing the tread by including therein one or more circumferential reinforcing elements having a triangular shape, as seen in meridian section, said triangle having its vertex oriented radially outwards.

The large number of these propositions and the great variety thereof indicate that it is not easy to achieve a good balance between all of the expected performance properties of a tyre and in particular to reconcile excellent grip, making it possible to equip sports vehicles, a low rolling resistance and low wear in order to preserve material and energy resources, specifically without worsening the noise generated by the tyre, which is an increasingly important parameter in terms of comfort and low environmental nuisance.

The objective of the invention is to achieve a better dynamic drift thrust response under turning stress without worsening the rolling resistance of the tyre or the noise generated by the tyre.

SUMMARY OF THE INVENTION

The subject of the invention is a tyre having an axis of rotation and a median plane perpendicular to the axis of rotation, and comprising:
 a crown reinforcement,
 a tread radially on the outside of the crown reinforcement, and axially between two shoulders, the tread comprising a contact face intended to come into contact with the roadway while the tyre is being driven on, the tread having a plurality of furrows oriented substantially circumferentially, each furrow having a furrow bottom, the tread being primarily made up of at least one rubber compound of given stiffness M, a sub-layer disposed radially on the outside of the crown reinforcement and radially on the inside of the tread, the sub-layer being flush with each furrow bottom, the sub-layer being made up of at least one rubber compound of given stiffness A, characterized in that, at least on one side axially with respect to the median plane:

each of the furrows is bordered axially on either side by a reinforcing element that extends radially from the sub-layer towards the outside of the tread to a radial height greater than 75% of the radial thickness of the tread, said reinforcing element having a variable axial width, from a maximum value of less than 30% of the axial width of said tread block, said axial width decreasing radially upwardly, each reinforcing element being made up of a rubber compound of given stiffness B, a covering layer is disposed radially on the sub-layer and axially covering the sub-layer between the reinforcing elements away from the furrows, and in each case between a reinforcing element and the shoulder, said covering layer being made up of the same material as the material of the reinforcing elements, the stiffnesses satisfying the following inequalities: A<M<B.

Preferably, at least 66% of the tread is made up of said rubber mixture that is predominant by volume. Preferably, the rubber compound of the tread has a dynamic shear modulus G* less than 4.0 MPa and advantageously less than 2.5 MPa.

Preferably, the dynamic shear modulus G* of the material of the sub-layer is less than 1.5 MPa, and advantageously less than 0.5 MPa; preferably, the tg δ value measured at 23° C. at 10 Hz and under an alternating shear deformation of 10% of the material of the sub-layer is less than 0.3.

Advantageously, the sub-layer is made of two different materials. In this case, for example, one of the materials is disposed axially towards the outside of the tyre and the other of the materials is disposed axially at the centre, the dynamic shear modulus G* of the material of the sub-layer disposed axially towards the outside being at least 1 MPa less than the dynamic shear modulus G* of the material of the sub-layer disposed axially at the centre. Still in the case of two different materials for the sub-layer, and in another example, one of the materials is disposed axially under the furrow bottoms and the other of the materials is interposed axially between the furrow bottoms, alternating with the first-mentioned material; the dynamic shear modulus G* of the material of the sub-layer disposed axially under the furrow bottoms is preferably at least 1 MPa less than the dynamic shear modulus G* of the other of the materials.

Preferably, when two different materials are used for the sub-layer, one of them has a tg δ value measured at 23° C. at 10 Hz and under an alternating shear deformation of 10% of less than 0.5 with respect to the other.

In an advantageous implementation of the invention, the dynamic shear modulus G* of the material of the covering layer and of the reinforcing elements is greater than 7 MPa and preferably greater than 12 MPa; very advantageously, the dynamic shear modulus G* of this material has a value greater than 20 MPa.

BRIEF DESCRIPTION OF THE FIGURES

The invention will now be described with the aid of the appended drawing, in which.

DETAILED DESCRIPTION OF THE INVENTION

Figure 1:
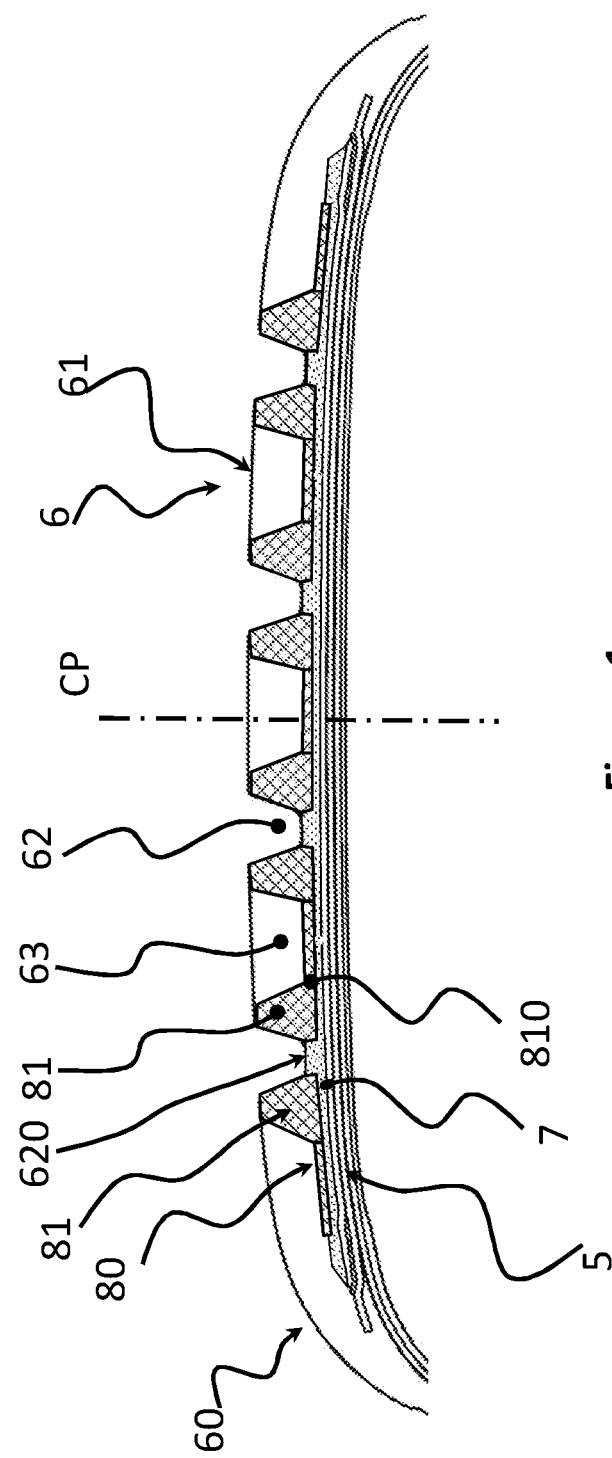
FIG. 1 schematically shows a partial meridian section through a tyre according to a first embodiment of the invention.

FIG. 1 shows a tyre, an equatorial plane CP, a crown reinforcement 5 and a tread 6. The tread extends axially from one shoulder 60 to the other shoulder. The tread comprises a contact face 61 intended to come into contact with the roadway when the tyre is being driven on. The tread 6 has tread blocks 63 that are separated by furrows 62 that are oriented substantially circumferentially. Each furrow 62 is delimited radially towards the inside by a furrow bottom 620. The crown also has a sub-layer 7 disposed radially on the outside of the crown reinforcement 5 and radially on the inside of the tread 6. It is also apparent that the material of the sub-layer 7 appears in the furrow bottom 620.

The sub-layer 7 is disposed radially directly on the crown reinforcement 5. As is known per se, the crown reinforcement has layers of cords or of monofilament reinforcers that are generally coated with a thin layer of rubber. In the context of the present invention, the indication that the sub-layer 7 is disposed radially directly on the crown reinforcement 5 means that it is in contact with the cords or reinforcers, not taking the rubber coating thereof into account. It is apparent that the sub-layer 7 is disposed axially between the shoulders 60.

Also visible is a covering layer 80 disposed radially on the sub-layer 7 and radially on the inside of the tread 6. Axially on either side of each of the furrows 62, there is a reinforcing element 81 in the form of a wedge (seen in meridian section). This reinforcing element 81 extends radially from the radially outer surface of the sub-layer 7 towards the outside of the tread 6 to a radial height greater than 75% of the radial thickness of the tread. Said reinforcing element 81 has a variable axial width, from a maximum value less than 50% of the axial width of said tread block, said axial width decreasing radially upwardly. The angle formed in radial section by the two lateral walls of said reinforcing element 81 is preferably between 10° and 50°, specifically for example 40°, as illustrated in the figures. Each reinforcing element is made up of the same rubber compound as the covering layer 80, thereby making it possible to extrude them in one and the same operation with the covering layer 80. It will also be noted that the covering layer 80 extends axially from one reinforcing element 81 to the other in the case of the tread blocks that are contained between two furrows 62, and extends axially from one reinforcing element 81 to the shoulder 60, covering substantially the entire sub-layer 7, in the case of the tread blocks situated at the axial ends of the tread. Finally, it will be recalled that, according to one of the features of the present invention, the sub-layer 7 is flush in each furrow bottom 620; thus, it is the material of the reinforcing elements 81 that appears at the lateral walls of each furrow 62, and it is the material of the sub-layer that appears at the furrow bottom 620.

The materials used for the sub-layer 7 will now be discussed. In order to characterize them, the dynamic shear modulus G* measured at 23° C. and under an alternating shear stress at a frequency of 10 Hz and at 10% deformation is used. Advantageously, the material of the sub-layer 7 is characterized by a dynamic shear modulus G* strictly less than 1.5 MPa and more preferably less than 0.5 MPa, and even ideally less than 0.3 MPa. In this way, use is made of a material having very low hysteresis in order to lower the rolling resistance of the tyre. This hysteresis is characterized by the tg δ value measured at 23° C. at 10 Hz and under an alternating shear deformation of 10%. Preferably, this value is around 0.05. Thus, the lower dynamic shear modulus of this material and its lower tg δ make it possible to further reduce hysteresis losses in favour of lower rolling resistance.

An example of an appropriate formulation for the material of the sub-layer 7, with a dynamic shear modulus G* of 2.0 MPa, is as follows:

TABLE 1

| Component | phr |
| --- | --- |
| NR | 60 |
| BR | 40 |
| N683 | 55 |
| 6PPD | 1.5 |
| Stearic acid | 0.5 |
| CBS | 1.5 |
| Sulfur insol 20H | 3 |
| ZnO | 3 |

The formulations are given by weight (phr meaning percentage of the weight of elastomer).

As for the covering layer 80 and the reinforcing elements 81, the material thereof is preferably characterized by a dynamic shear modulus G* greater than 12 MPa. In this way, good cornering stiffness is achieved and an excellent performance compromise is obtained, reconciling a drift thrust that is able to give the tyre a good dynamic response and excellent rolling resistance. Advantageously, the tg δ value measured at 23° C. at 10 Hz and under an alternating shear deformation of 10% of this material is less than 0.15.

An example of an appropriate formulation for the material of the covering layer 80 and the wedges is given in Table 1 of the abovementioned patent application WO2016/174100. It should be noted in passing that, as is well known to a person skilled in the art, the parameters describing the performance of the rubber compounds, such as the dynamic shear modulus G* or tg δ with the same formulation, have values that also depend on the vulcanization law.

As for the tread material, a rubber compound can be used in a very wide range of dynamic shear moduli G*; advantageously, said dynamic shear modulus G* is less than 2.5 MPa.

Figure 2:
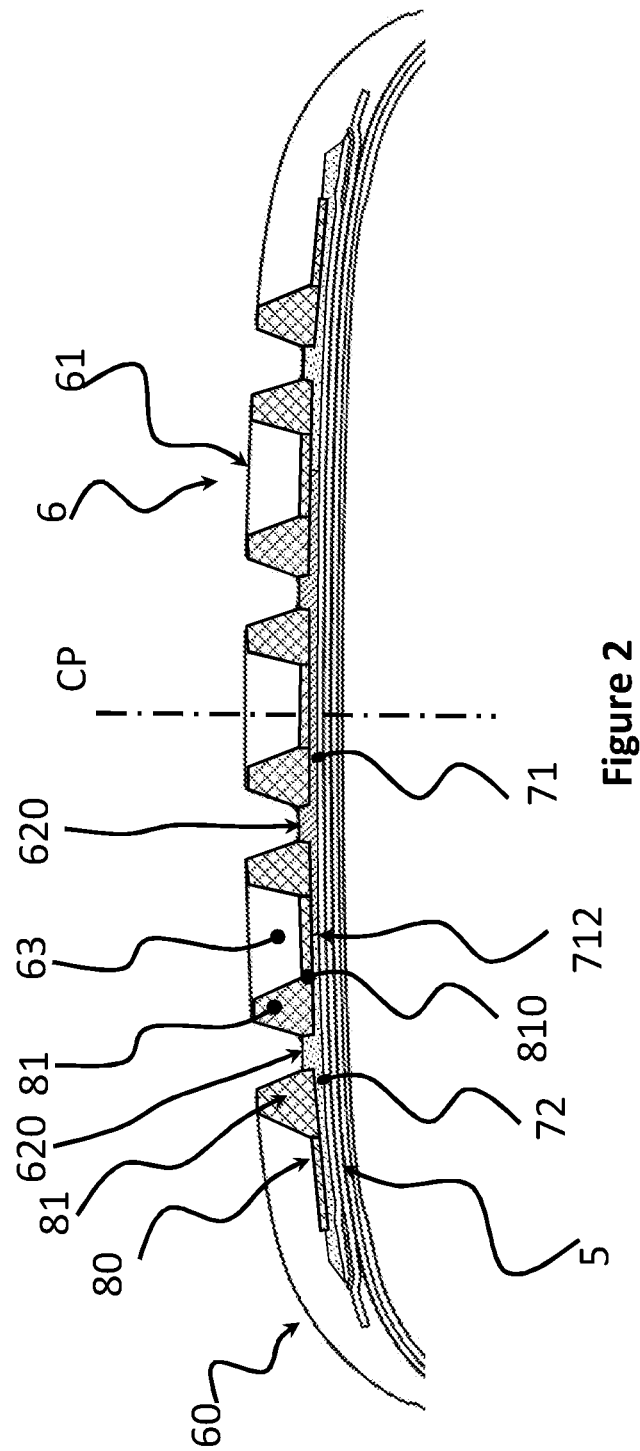
FIG. 2 schematically shows a partial meridian section through a tyre according to a second embodiment of the invention.

FIG. 2 illustrates a second embodiment, in which the sub-layer is formed by a first base layer 71 and a second base layer 72. The first base layer 71 is disposed axially between the median plane CP and a transition edge 712; the transition edge 712 is situated axially between the median plane CP and a shoulder 60; in this embodiment, there is one transition edge 712 in each of the axial halves on either side of the plane CP. The second base layer 72 is disposed axially between the transition edge 712 and a shoulder 60. Otherwise, this embodiment is identical to the first embodiment.

It should be noted that the stiffness A1 of the material of the first base layer 71 is greater than the stiffness A2 of the material of the second base layer 72. Of course, there could be more than two different materials and therefore two or more transition edges, or it is even possible for the variation in stiffness to be gradual, decreasing axially from the centre to the shoulders.

An example of an appropriate formulation for the material of the first base layer 71, with a dynamic shear modulus G* of 2.0 MPa, is as follows:

TABLE 2

| Component | phr |
| --- | --- |
| NR | 60 |
| BR | 40 |
| N683 | 55 |
| 6PPD | 1.5 |
| Stearic acid | 0.5 |
| CBS | 1.5 |
| Sulfur insol 20H | 3 |
| ZnO | 3 |

The formulations are given by weight (phr meaning percentage of the weight of elastomer).

An example of an appropriate formulation for the material of the second base layer 72, with a dynamic shear modulus G* of 0.2 MPa, is as follows:

TABLE 3

| Component | phr |
| --- | --- |
| NR | 100 |
| Carbon black | 4 |
| 6PPD | 2.2 |
| DPG | 2.1 |
| Stearic acid | 3 |
| ZnO | 1.5 |
| Resin | 29.3 |
| HTO | 38 |
| CBS | 1.4 |
| Sulfur | 1.6 |

The formulations are given by weight (phr meaning percentage of the weight of elastomer).

Figure 3:
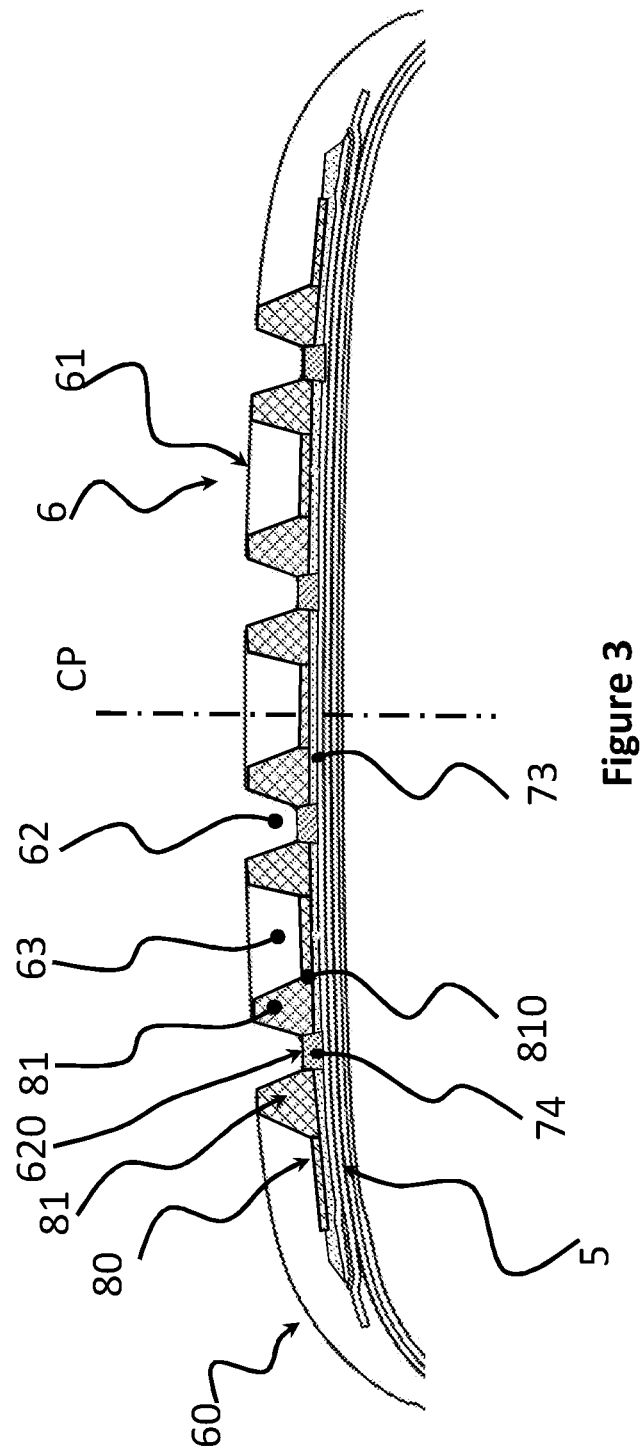
FIG. 3 schematically shows a partial meridian section through a tyre according to a third embodiment of the invention.

FIG. 3 illustrates a third embodiment, in which the sub-layer is formed by a plurality of portions 73 that are all made of the same materials as set out above for the sub-layer 7 of the first embodiment, with interposition of beneath-void portions 74 that are disposed radially between the crown reinforcement 5 and the furrow bottom 620, and axially facing each of the furrows 62. The material of the portions 73 is the same as the material of the first base layers 71 and the material of the portions 74 is the same as the material of the second base layers 72.

Examples of axially symmetric tyres have been described. However, it should be noted that results are obtained that are already very advantageous if only the axial half of the tyre that will be mounted towards the outside of the vehicle is designed as explained above. A person skilled in the art, who is a tyre designer, could adopt embodiment variants, for example variants in which the tread itself comprises several different materials that are superposed radially and/or juxtaposed axially.

Tests

As control, use is made of a tyre R having a tread made of a compound with a dynamic shear modulus G* of 3.0 MPa, and a single-material sub-layer extending axially from one shoulder of the tyre to the other and having a thickness that is radially substantially constant; as seen in radial section, the profile of this sub-layer is the same as the profile of the assembly of the sub-layer 7; this sub-layer is formed by a compound having a dynamic shear modulus G* of 2.0 MPa; the tyre R does not have a covering layer or reinforcing elements. A first test tyre T1 is in accordance with the example of the invention illustrated in FIG. 1, using the materials cited by way of example above. A second test tyre T2 is in accordance with the example of the invention illustrated in FIG. 2, using the materials cited above by way of formulation examples. The rolling resistance value (kg/T) and cornering stiffness value Dz)(N/°) are with respect to the base 100 for the control R and expressed as relative values with respect to the base 100 for the tyres according to the invention. The measurement of the cornering stiffness of a tyre makes it possible to evaluate the road holding of a vehicle through the capacity thereof to react during an action on the steering wheel or to follow the trajectory of a bend. This cornering stiffness is measured at 80% of the nominal load (load index) on an apparatus and consists in causing a tyre mounted on a rim and inflated to a nominal pressure to roll on a bonded metal strip, by means of a machine of the "Flat Track" type. The measurement is taken when the tyre is rolling at 80 km/h with a chain of stresses varying the load, cornering and camber conditions. The rolling resistance can be measured in accordance with the standard ISO28580.

| | Results | |
|---|---|---|
| Tyre | Rolling resistance (Kg/T) | Cornering stiffness Dz (dan/°) |
| R | 5.51 | 164 |
| T1 | 5.3 | 187.7 |
| T2 | 5.6 | 195 |

It will be noted that the invention makes it possible to shift the performance compromise between rolling resistance and cornering stiffness; it allows a very significant improvement in cornering stiffness and a slight improvement in rolling resistance (example T1) or a great improvement in cornering stiffness at the cost of an entirely acceptable worsening in the rolling resistance.

The invention claimed is:

1. A tire having an axis of rotation and a median plane perpendicular to the axis of rotation, and comprising:
    a crown reinforcement,
    a tread positioned radially on the outside of the crown reinforcement and axially between two shoulders, the tread comprising a contact face intended to come into contact with a roadway while the tire is being driven on, the tread being primarily made up of at least one rubber compound of given dynamic shear modulus M, and the tread having a plurality of furrows oriented substantially circumferentially, each furrow having a furrow bottom, the tread including a plurality of tread blocks separated by the furrows; and
    a sub-layer disposed radially on the outside of the crown reinforcement and radially on the inside of the tread, the sub-layer being made up of at least one rubber compound of given dynamic shear modulus A, the sub-layer forming each furrow bottom and having outer axial ends,
    wherein, at least on one side axially with respect to the median plane, each of the furrows is bordered axially on each side of the furrow by a reinforcing element that extends radially from the sub-layer toward the outside of the tread to a radial height greater than 75% of a radial thickness of the tread, the reinforcing element having a variable axial width, from a maximum value of less than 30% of an axial width of the tread, the axial width decreasing radially upwardly, and each reinforcing element being made up of a rubber compound of given dynamic shear modulus B,
    wherein, at least on one side axially with respect to the median plane, a covering layer is disposed radially on the sub-layer and axially covers the sub-layer between adjacent reinforcing elements within a tread block in an axial direction away from the furrows and between a reinforcing element and the shoulder such that the covering layer is axially separated by the furrows, the covering layer being made up of the same material as the material of the reinforcing elements,
    wherein, at least on one side axially with respect to the median plane, the stiffnesses satisfy the following inequalities: A<M<B, each dynamic shear modulus A, M, and B being measured at 23° C. and under an alternating shear stress at a frequency of 10 Hz and at 10% deformation, and
    wherein the crown reinforcement extends axially beyond the outer axial ends of the sub-layer.

2. The tire according to claim 1, wherein the dynamic shear modulus A of the material of the sub-layer is less than 1.5 MPa.

3. The tire according to claim 2, wherein the dynamic shear modulus A of the material of the sub-layer is less than 0.5 MPa.

4. The tire according to claim 2, wherein the tg δ value measured at 23° C. at 10 Hz and under an alternating shear deformation of 10% of the material of the sub-layer is less than 0.3.

5. The tire according to claim 1, wherein the sub-layer is made of two different materials.

6. The tire according to claim 5, wherein one of the materials is disposed axially toward the outside of the tire and the other of the materials is disposed axially at the center, the dynamic shear modulus of the material of the sub-layer disposed axially toward the outside being at least 1 MPa less than the dynamic shear modulus of the material of the sub-layer disposed axially at the center.

7. The tire according to claim 5, wherein one of the materials is disposed axially under the furrow bottoms and the other of the materials is interposed axially between the furrow bottoms, alternating with the first-mentioned material, the dynamic shear modulus of the material of the sub-layer disposed axially under the furrow bottoms being at least 1 MPa less than the dynamic shear modulus of the other of the materials.

8. The tire according to claim 1, wherein the dynamic shear modulus of the material of the covering layer and the dynamic shear modulus B of the reinforcing elements is greater than 7 MPa.

9. The tire according to claim 8, wherein the dynamic shear modulus of the material of the covering layer is greater than 12 MPa.

* * * * *